(12) United States Patent
Miller et al.

(10) Patent No.: US 8,732,837 B1
(45) Date of Patent: May 20, 2014

(54) SYSTEM AND METHOD FOR MONITORING THE SECURITY OF COMPUTING RESOURCES

(75) Inventors: Mitchell L. Miller, Martinez, CA (US); Terry L. Miller, Huntersville, NC (US); Richard C. Mills, St. Augustine, FL (US); James C. Pacheco, Concord, CA (US); Kevin Toyama, Pittsburg, CA (US); Alan Wong, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 1442 days.

(21) Appl. No.: 11/535,744

(22) Filed: Sep. 27, 2006

(51) Int. Cl.
| | |
|---|---|
| *G06F 12/14* | (2006.01) |
| *G06F 12/16* | (2006.01) |
| *G06F 15/173* | (2006.01) |
| *G06F 15/177* | (2006.01) |
| *G06F 17/00* | (2006.01) |
| *G08B 29/00* | (2006.01) |

(52) U.S. Cl.
USPC .......... 726/25; 726/1; 726/2; 726/22; 726/23; 726/24; 726/26; 726/34; 713/1; 709/223; 709/224; 709/225

(58) Field of Classification Search
USPC ........ 726/22–26, 1–2, 34; 709/224, 223–225; 713/1
See application file for complete search history.

(56) References Cited

U.S. PATENT DOCUMENTS

| | | | |
|---|---|---|---|
| 2003/0065942 A1* | 4/2003 | Lineman et al. | 713/201 |
| 2004/0193918 A1* | 9/2004 | Green et al. | 713/201 |
| 2006/0195566 A1* | 8/2006 | Hurley | 709/224 |
| 2007/0233854 A1* | 10/2007 | Bukovec et al. | 709/224 |

* cited by examiner

*Primary Examiner* — Beemnet Dada
*Assistant Examiner* — Kalish Bell
(74) *Attorney, Agent, or Firm* — Michael A. Springs; Moore & Van Allen PLLC; James C. Edwards

(57) ABSTRACT

System and method for monitoring the security of computing resources. A server agent and client agents can be deployed to provide a method and a means for monitoring security-related settings for a plurality of computing systems deployed throughout an enterprise. The status of each setting can be recorded, and these results can be used to produce a compliance report for the computing system, as well as reports for groups of computing system or the entire enterprise. The reports or portions of a report or reports can be provide to users of the system via a Web site, Email alerts, or any other suitable mechanism. A compliance score for a system or collection of systems can be calculated and used and/or displayed as part of the reports that are generated.

17 Claims, 8 Drawing Sheets

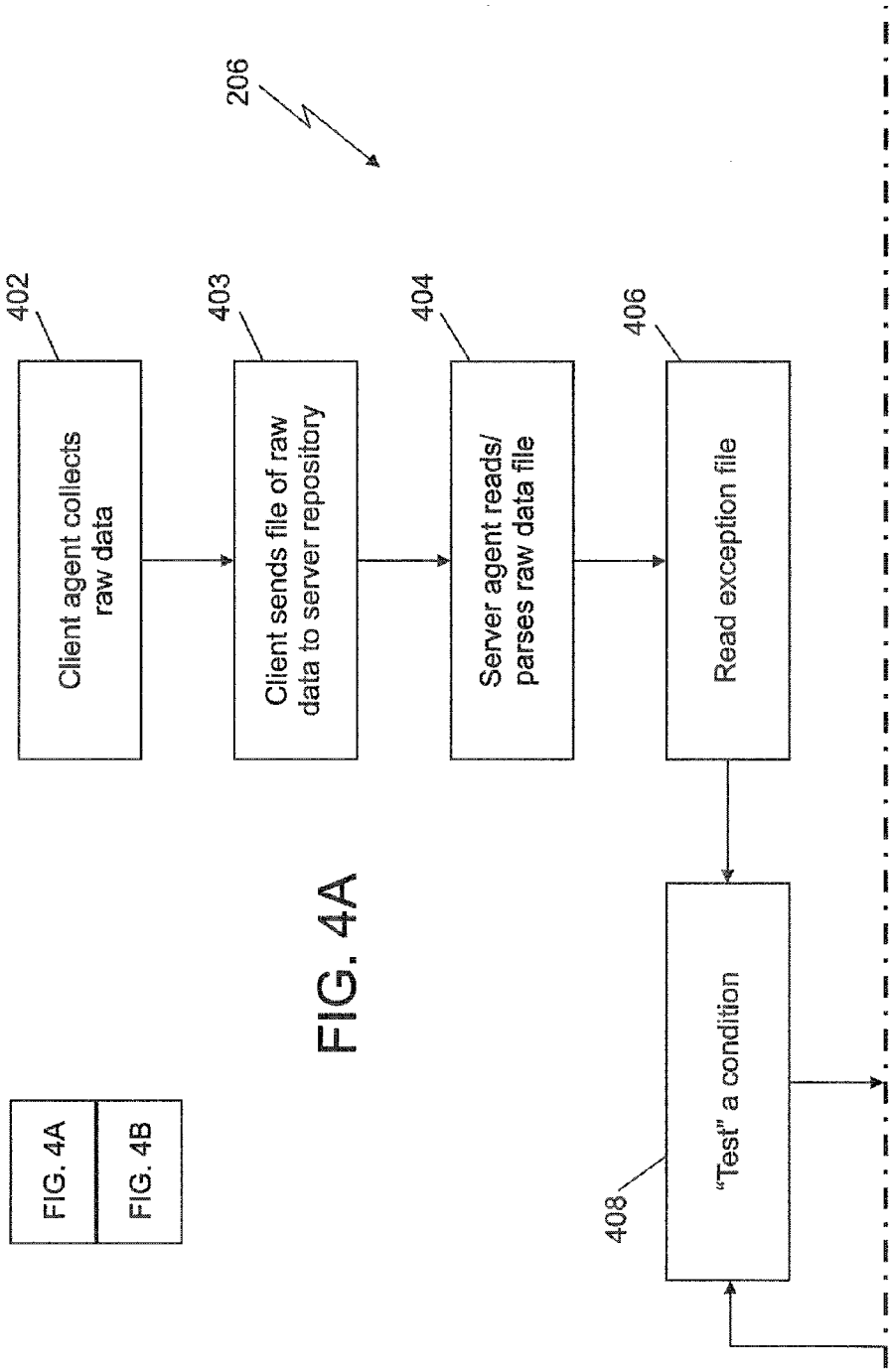

FIG. 6

| Total Number of Servers Reviewed | 1858 servers |
| --- | --- |
| Percentage Passed | 99.80% |
| Percentage Passed w/exceptions | 5.24% |
| Percentage Failed | 0.20% |
| Total Number of Issues that Passed | 32,625 |
| Total Number of Issues that Passed with Exceptions | 1,809 |
| Total Number of Issues that Failed | 68 |
| Total Checks made | 34,502 |

Click on the group name to view their results

| Group Name | Total # of Servers | Total Passed (P) | Total Passed with Exceptions (PE) | Total Failed (F) | Total Checks made | % Passed | % Passed w/exceptions | % Failed |
| --- | --- | --- | --- | --- | --- | --- | --- | --- |
| GROUP #1 | 268 | 4359 | 460 | 5 | 4824 | 99.90% | 9.54% | 0.10% |
| GROUP #2 | 9 | 144 | 19 | 0 | 163 | 100.00% | 11.66% | 0.00% |
| GROUP #3 | 234 | 4245 | 147 | 8 | 4400 | 99.82% | 3.34% | 0.18% |
| GROUP #4 | 333 | 5975 | 223 | 7 | 6205 | 99.89% | 3.59% | 0.11% |
| GROUP #5 | 73 | 993 | 321 | 0 | 1314 | 100.00% | 24.43% | 0.00% |
| GROUP #6 | 128 | 2224 | 164 | 44 | 2432 | 98.19% | 6.74% | 1.81% |
| GROUP #7 | 112 | 1789 | 112 | 3 | 1904 | 99.84% | 5.88% | 0.16% |
| GROUP #8 | 659 | 12229 | 289 | 1 | 12519 | 99.99% | 2.31% | 0.01% |
| GROUP #9 | 15 | 222 | 33 | 0 | 255 | 100.00% | 12.94% | 0.00% |
| GROUP #10 | 27 | 445 | 41 | 0 | 486 | 100.00% | 8.44% | 0.00% |

FIG. 7

Security Scan Results

Click on the hyperlink "F" to view the failed issues for server CISCOCONF

| Hostname | ciscoconf | view log |
|---|---|---|
| Processed on: 2005-05-15 @ 00:00:01 | | |
| Issue No | Test Name | Pass/Fail |
| 1 | SYSTEMFILES | P |
| 2 | PASSWD | P |
| 3 | SERVICES | PE |
| ● ● ● | | |
| N-1 | LOGINLOG | P |
| N | SYSLOG | P |
| %Passed | | 100.00% |
| %Passed w/Exceptions | | 5.26% |
| %Failed | | 0.00% |
| Total Number Passed | | N |
| Total Number Failed | | 0 |
| Total Checks made | | N |

SYSTEM AND METHOD FOR MONITORING THE SECURITY OF COMPUTING RESOURCES

BACKGROUND

Today, many businesses must deal with increasing numbers of information privacy and information security related regulations, rules and controls. Risk of failing to deal with security issues, like other operational risk, is often placed on the board of directors or other executives of an institution or organization. In addition, the ease with which the Internet can be accessed and used from a personal computer has led even greater concerns that "hackers" and other nefarious individuals may access an enterprise's computer systems and compromise information security and/or privacy. Thus, there is an increasing need to provide for comprehensive governance of the security of an enterprise's information systems. For very large and geographically diverse organizations, this requirement can create significant challenges and cause significant resource expenditure, especially if individual computer resources or groups of computing resources must be separately monitored.

SUMMARY

Example embodiments of the invention provide a method and a means for monitoring security-related settings for a plurality of computing systems deployed throughout an enterprise. According to example embodiments of the invention, security-related settings for each computing system that is being monitored are accessed and each setting is tested in an automated fashion. The status of each setting is recorded, and these results can be used to produce a compliance report for the computing system, as well as reports for groups of computing system or the entire enterprise. The reports or portions of a report or reports can be provide to users of the system via a Web site, Email alerts, or any other suitable mechanism.

In at least some embodiments, an exceptions file can be accessed and taken into account during the testing. The exceptions file includes exceptions for security-related settings. Thus, a status or result for a security setting may consist of one of "passed," "failed," or "passed with exception." In some embodiments, a compliance score for a system or collection of systems can be calculated and used and/or displayed as part of the reports that are generated.

In example embodiments, the invention can be implemented by means of a computer program product executing on one or more computer systems and/or entities. These entities can include a client agent that is deployed to client systems under test, and a server agent that manages the testing. In some embodiments, the client agent can perform the testing, recording, and calculations needed. In other embodiments, the client agent can simply send raw data about a system to the server, agent, and the server agent can perform more of the work of carrying out the invention. In example embodiments, the server agent maintains a data store of results and other relevant information and produced alerts and reports for users. These are but examples, as the functions required can be divided between a client agent and server agent in almost infinite ways based on design choices that are within the skill of any practitioner in the art. Note that if the "testing" is done by a server agent, this testing may consist of, in some embodiments, parsing and evaluating a data file to determine the security settings of the subject computer system.

BRIEF DESCRIPTION OF THE DRAWINGS

FIG. 4 is shown in two parts, FIG. 4A and FIG. 4B.

FIGS. 5 through 7 are screenshots that provide a general feel of how reports of test results might be viewed via the Web when employing an embodiment of the invention.

DETAILED DESCRIPTION OF THE INVENTION

Figure 1:
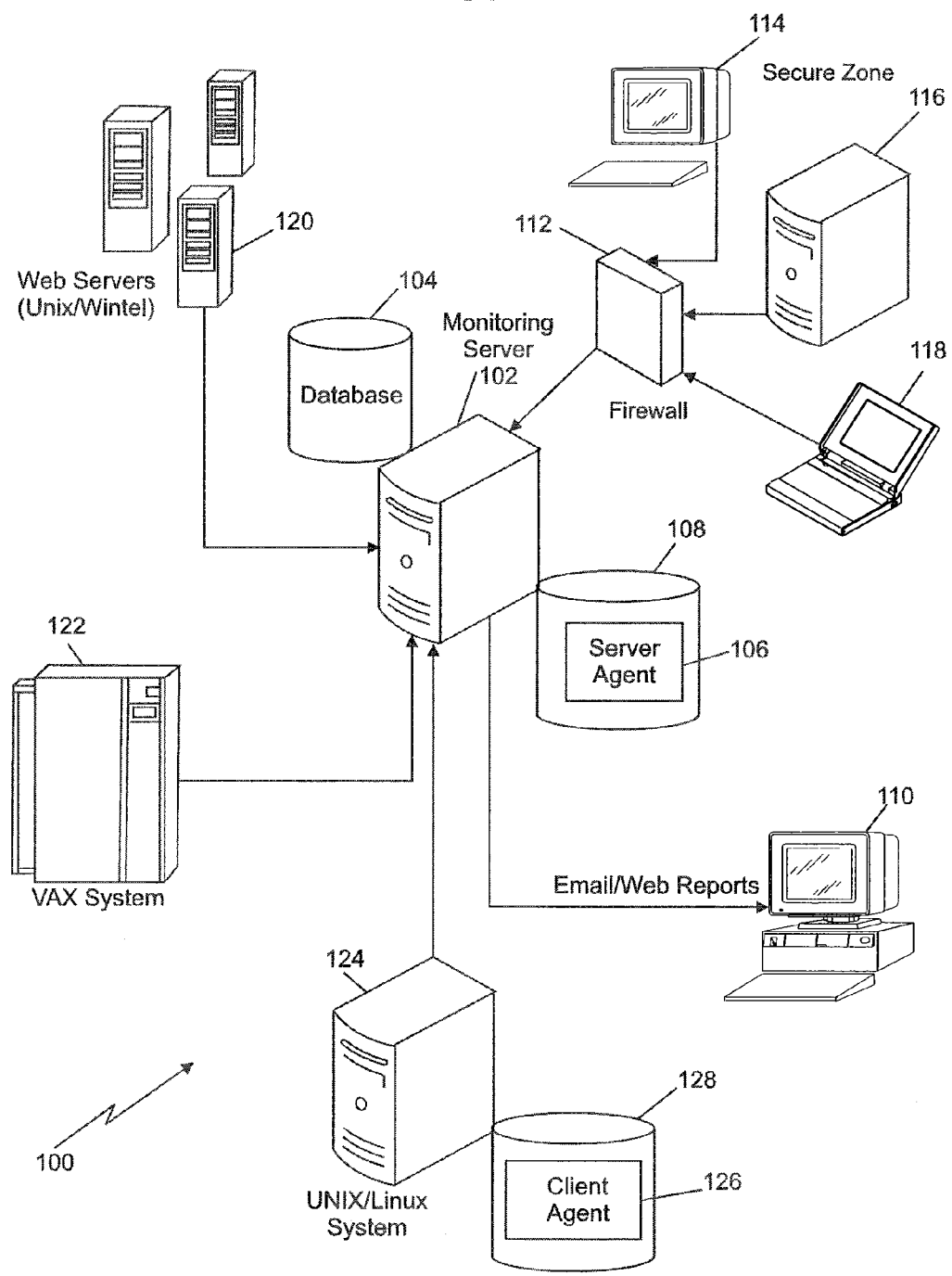
FIG. 1 is a system block diagram illustrating an example operating environment of embodiments of the invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

The computer readable medium may be an electronic, magnetic, optical, electromagnetic, or semiconductor system, apparatus, or device. More specific embodiments of the computer readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations, screenshots, and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

It may be beneficial for a reader to learn or review at this point how some terminology is used herein. Other terms not discussed here have their ordinary meaning within the art, or will be explained in the context of their use. References are made in this disclosure to "testing" or "running tests" in the context of evaluating security-related settings of a computer system. This terminology is meant in its broadest sense. A client agent on a computer system being tested may actually probe the stored information on the computer to determine these settings. Alternatively, testing may refer to parsing and making determinations based on stored information on a server wherein this stored information contains lists or some other indications of the settings of a particular client computer system. Further, reference is made to "displaying" compliance information, compliance reports, or test results. Such displaying may be direct to a user, or it may be accomplished by sending the information in an Email to a user for eventual viewing, so that such displaying may not be in real time.

By way of example, the types of "security settings" that may be tested by an embodiment of the present invention include whether system files on a computer system are appropriately set so that they are read only, whether passwords used to access the system are of appropriate length and format to reduce the chances of being guessed by either a human, or password hacking algorithm, and whether appropriate logging functions are activated so that accesses of the computer system being tested are recorded and can be tracked. Other examples might include whether the most up to date version of an operating system is installed, whether the computer system is set up so that only an administrative user can make certain changes, and whether certain system services that represent a high level of security exposure are turned off, or whether access to these services is appropriately restricted. It should be noted that in these examples, a result of a determination made as to each of these settings can be expressed in a binary fashion, for example, either pass or fail, although a pass determination can be further qualified with exceptions. One of skill in the art should be able to elaborate on all of the types of settings that could be tested in this way with a particular embodiment of the invention, or design a system where each test result is more detailed, or expressed in a different way.

With respect to the settings tested, it should be noted that which of these settings are tested may depend on the operating system of the computer system being tested. For example, certain settings will be available in a Linux or UNIX computer system that would not be available in a Windows based computer system, and vice versa. A server agent or client agent which is used in implementing an embodiment of the invention can be tailored to the particular type of computer system being tested. Thus, an embodiment of the invention can be set up so that all of the various instruction execution platforms within an enterprise can be tested appropriately, and the results can be presented in an appropriate manner.

FIG. 1 is a block diagram of system 100 which implements an example embodiment of the invention. Centrally located in FIG. 1, is monitoring server 102 which includes or has access to database 104, a database of recorded test results and accompanying information, for example, when certain systems were tested, when tests are scheduled, etc. Server 102 includes server agent 106, which resides, at least in part, on medium 108. In this embodiment, medium 108 is a fixed disk drive either within, or associated with server 102. As has been discussed, server agent 106 can reside on any of varied kinds of media, including portable media which can be used to install a server agent on other servers, in other parts of an enterprise. Workstation or personal computer 110 presents reports on the testing to a user. Personal computer 110 can also be used to input information to control the way testing is done or which computer systems are tested. Computer 110 may be located remotely, and interact with server 102 over a network. Computer 110 may even be remotely located so that it accesses server 102 via the Internet. A user can direct computer 110 to access reports via a Worldwide Web application controlled by server agent 106, or reports may be Emailed to an account which is accessed by a user of computer 110.

All other computer systems and/or instruction execution platforms in system 100 of FIG. 1 are computer systems which are being or can be tested according to embodiments of the invention. A secure zone within an enterprise making use of the invention is shown behind firewall 112. This secure zone includes workstation 114, server 116, and laptop computer 118. These devices may run some version of the Windows operating system published by Microsoft, a version of UNIX, for example, Apple's Mac OS X operating system, Linux, or any other operating system for which a client agent can be designed and written. Web servers 120 can also be tested by an embodiment of the invention. These may run well-known Web server software such as Windows 2000 Server, Apache, Cold Fusion, or any other software, platform, database management system (such as UDB, DB2 Oracle, MySQL, Microsoft SQL Server) or Web technology. Computer system 122 is a so-called "VAX" system. A client agent can be provided for this system so that it can also be tested and results recorded according to example embodiments of the invention.

Still referring to FIG. 1, system 124 is a UNIX or Linux computer system. For purposes of illustration, detail of client agent 126 residing on fixed disk media 128 is illustrated for system 124. As previously discussed, and as will be discussed in greater detail with respect to FIGS. 3 and 4, the various processes and sub-processes which are used with an embodiment of the invention may be divided in infinite ways between client agent 126 and server agent 106. It should also be understood that in the example embodiment of FIG. 1, all computer systems in system 100 which can be subject to testing by an embodiment of the invention would have client agents installed. For clarity and due to space considerations, the detail of a client agent being present is only illustrated with respect to computer system 124.

Figure 2:
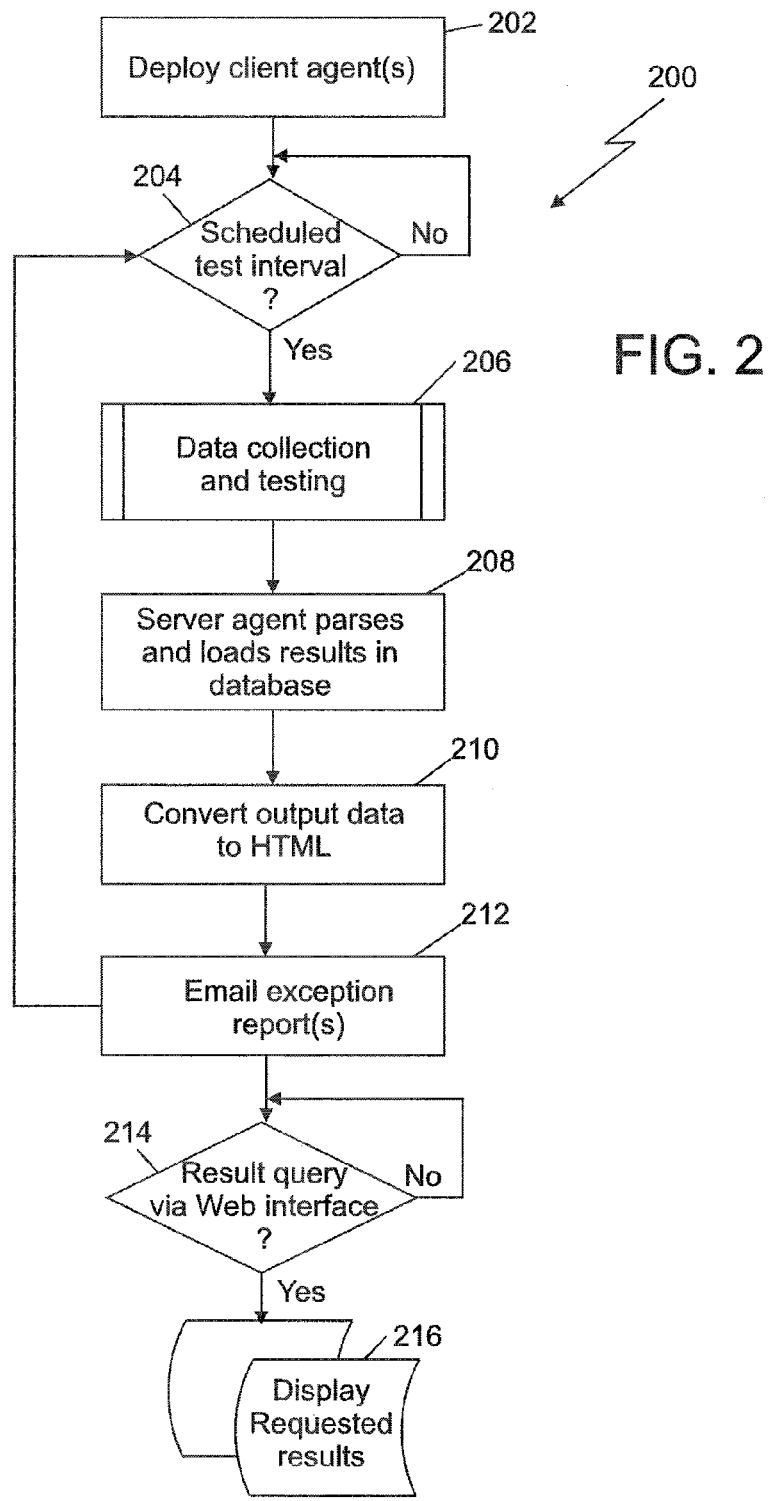
FIGS. 2 through 4 are flowcharts that illustrate processes of example embodiments of the invention.

FIG. 2 illustrates the high level process, 200, of example embodiments of the invention. FIG. 2 is presented as a flowchart. Like most flowcharts, the various elements of the process are represented as process or sub-process blocks. At block 202 a client agent is deployed to each computer system within an enterprise that is to be subject to the testing and reporting described by example embodiments of the invention. At block 204, the system waits for a scheduled test interval for each particular computer system. Data collection and testing for a computer system according to example embodiments of the invention is carried out at block 206. Further detail of some example testing processes which can be done as part of the data collection and testing is discussed with respect to FIGS. 3 and 4.

Still referring to FIG. 2, at block 208, the server agent parses results and loads them into a database. In example embodiments of the invention, reporting information or other output data can be formatted in hypertext markup language (HTML) at block 210 for convenient presentation to users. At block 212, the system Emails exception reports listing failed tests, tests that were passed with exceptions, or any other information desired, to a user or users. Output data for presentation to users is maintained in this example embodiment on a Web server application which resides at the monitoring server. When a query for such information is received at block 214, the appropriate results are displayed at block 216. It should also be noted that, in parallel with such queries, once exception reports are mailed, processing returns to block 204 to await the next scheduled test for a particular computer system under test.

Figure 3:
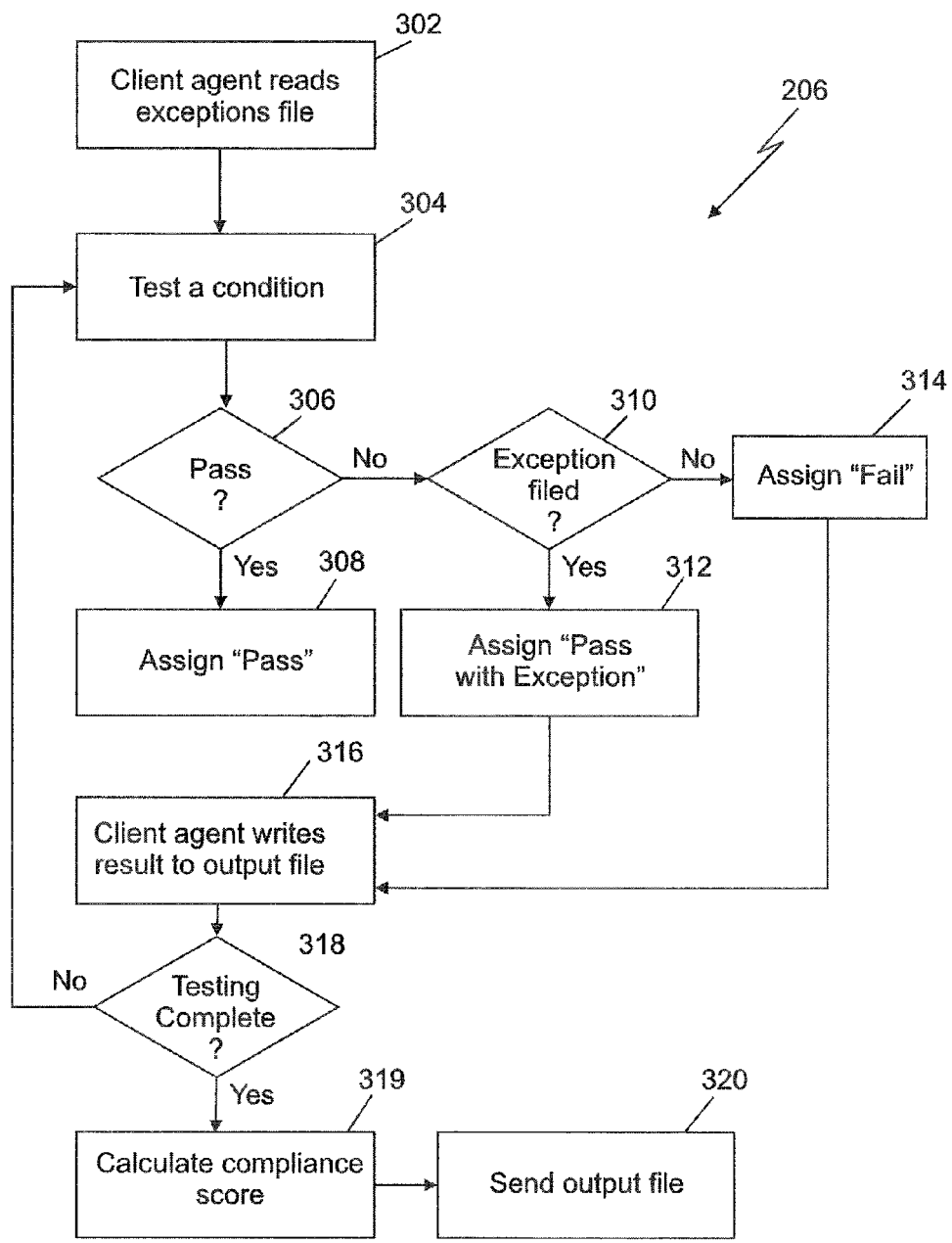

FIG. 3 illustrates one embodiment of the testing and data collection process, 206, discussed with respect to FIG. 2. In the example of FIG. 3, testing is actually performed by client agents. At block 302, the client agent reads an exceptions file which lists exceptions for the particular computer system to certain test parameters. At block 304 a condition is tested. A "condition" in this context is the setting of a particular parameter or system value which has security related implications. Blocks 306, 308, 310, 312, and 314 all describe the logic with which a particular security related parameter is tested and a result value is recorded for the test. At block 306, a determination is made as to whether the parameter has passed, that is in most cases, whether the parameter is set appropriately. If so, the system assigns a "pass" to the parameter at block 308. If not, a check is made at block 310 as to if an exception for this parameter was read from the exceptions file at block 302. If so, the system assigns a "pass with exception" value for this test result at block 312. If there is no exception, processing proceeds to block 314, where the agent assigns a "fail" result to this particular condition or parameter.

Still referring to FIG. 3, at block 316, the client agent writes the test result to an output file. At block 318 a determination is made as to whether testing is complete, that is, as to whether there are any more conditions to test. If testing is not complete, processing branches back to block 304, where the client agent tests another condition, otherwise, processing proceeds to block 319, where a compliance score is calculated. At block 320, an output file describing the test results is sent by the client agent to the server agent. It should be noted that in example embodiments described herein, a compliance score is expressed as a simple percentage. That is, if 90% of the tests passed, then a compliance score would be expressed as 90%. As will become clear when discussing the screen shots presented later, the compliance score can include both parameters that passed and parameters that passed with an exception. Compliance scores can be aggregated across groups, machines, or the entire enterprise. Additionally, one of skill in the art can devise other ways of representing or calculating a compliance score as business needs dictate.

Figure 4B:
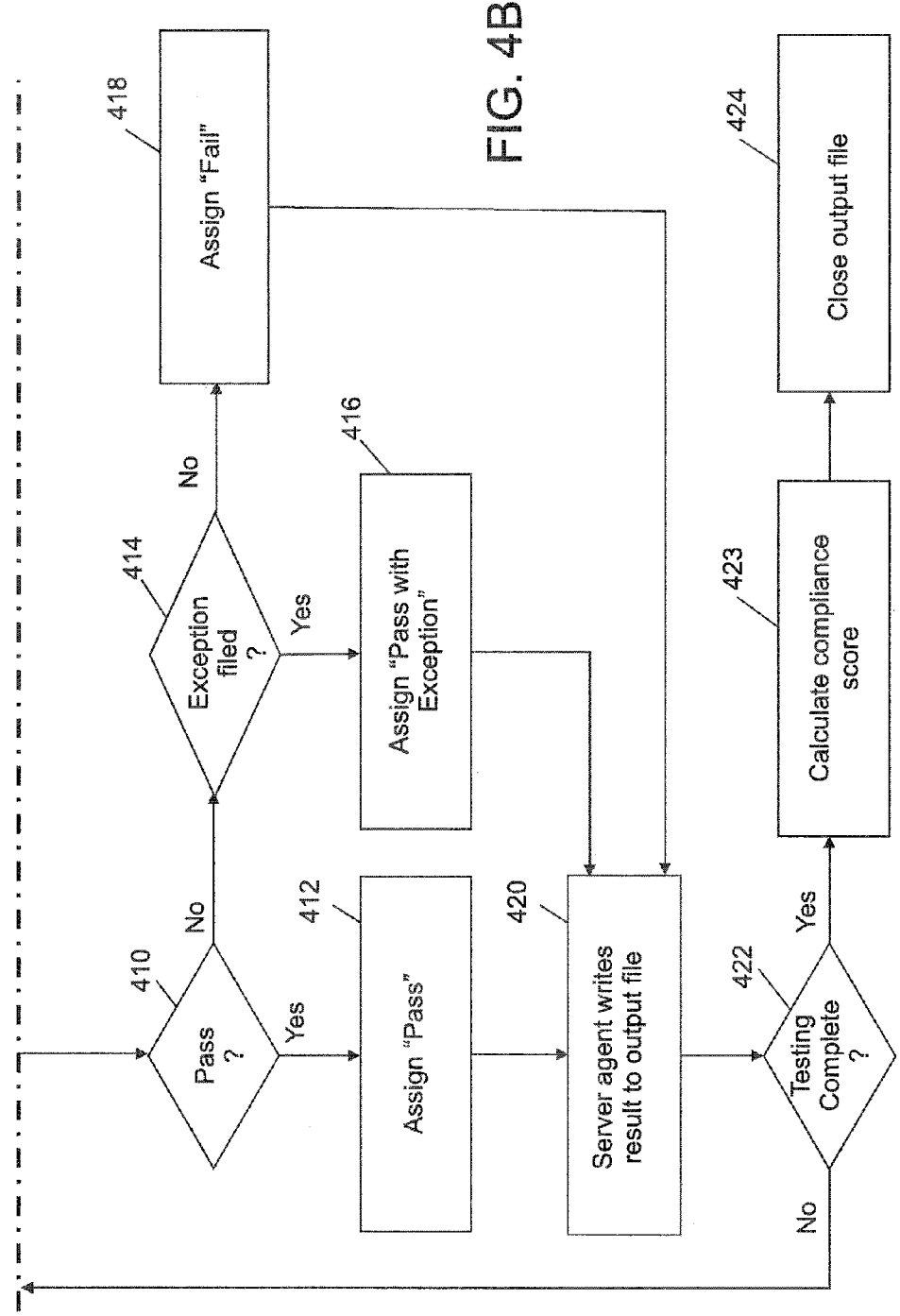

FIG. 4 is a flowchart which illustrates another alternative embodiment of testing and data collection of process 206. FIG. 4 is shown in two parts for clarity, FIG. 4A and FIG. 4B. In the embodiment of FIG. 4, much of the work of the invention is performed by the server agent, with the client agent primarily gathering raw data. At block 402 of FIG. 4, the client agent collects data about all relevant parameter settings. This data may be referred to herein as "raw" data. At block 403, the client sends the raw data file to the data repository at the server. At block 406, the server agent reads the exceptions file. This exceptions file may have been previously stored by way of a user denoting various exceptions for each particular computer system. Alternatively, the exceptions file can be sent by the client agent at the same time as the raw data, or on a scheduled interval.

Still referring to FIG. 4, the server agent tests a condition at block 408. As previously discussed, this "testing" may be conducted by simply examining the raw data in the data base or data repository at the monitoring server. In a manner similar to that previously discussed with respect to FIG. 3, blocks 410, 412, 414, 416, and 418 describe the logic of testing and assigning or recording a result for each security-related parameter being evaluated. If the parameter is set as required at block 410, the parameter is assigned a "pass" at block 412. Otherwise, processing proceeds to block 414, where a determination is made as to whether an exception has been filed or stored for that particular parameter. If so, the agent records a "pass with exception" result at block 416. Otherwise, a "fail" result is recorded for the parameter at block 418.

At block 420 of FIG. 4, the current result is written to an output file. At block 422, a determination is made as to whether testing is complete, that is, whether there are any more security related parameters to evaluate. If testing is not complete, processing branches back to 408 where the next condition or parameter can be tested. If testing is complete at block 422, processing proceeds to block 423 and the server agent calculates the compliance score. Note that in the embodiment of FIG. 4, these recording and calculation functions are performed by the server agent as opposed to the client agent as previously described. At block 424, the output file is closed and saved for further processing.

It cannot be overemphasized that the balance of work in an embodiment of the invention can be distributed in various ways between the client agent, server agent, and possibly other entities or agents within an enterprise. The distribution of work previously illustrated is shown as an example only. Also, the connectivity between the various computer systems being tested, and the monitoring server has not been discussed in detail. This connectivity can be achieved, and the files sent and received between the various agents as required via any networking technology as will be readily appreciated by those of skill in the art. In a typical enterprise, various systems are interconnected via local area network (LAN) or wide area network (WAN). Connections between the various systems can also be made via secure protocols over the public Internet. Servers and computer systems can be organized in various ways into groups or workgroups either within or across geographies, and compliance scores and other statistics related to the testing described herein can be aggregated on the basis of those groups, or on the basis of the entire enterprise.

Figure 5:
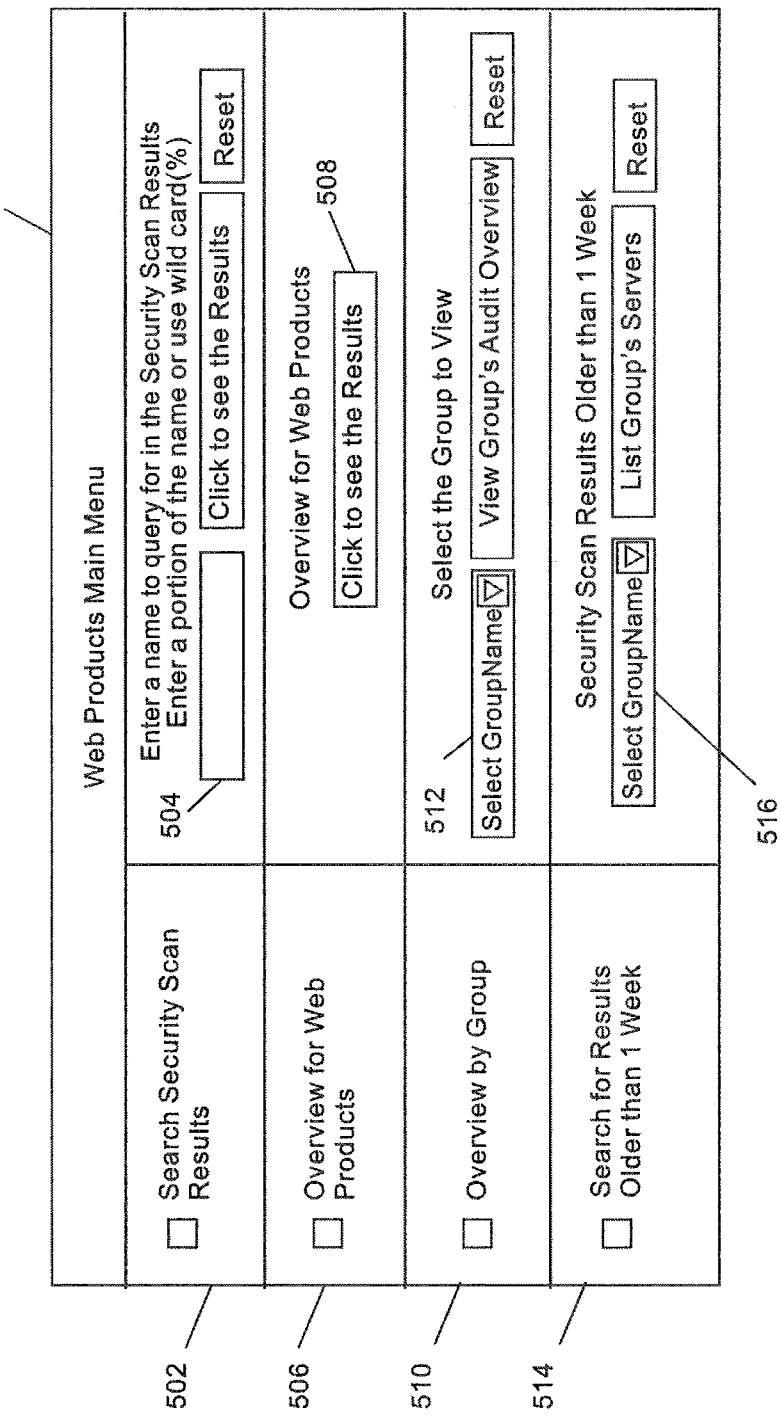

FIGS. 5, 6, and 7 present screen shots that give a flavor of how a user might access results in compliance reports via a Web interface according to example embodiments of the invention. FIG. 5 is an entry level screen, 500, for a testing tool in use by a Web Products Organization in an enterprise. Screen 500 includes a menu of four choices. A security scan results query option, 502, allows entry of a group or computer system name in box 504 so that results for that resource can be searched and retrieved. Menu option 506 provides button 508 which can be clicked with a mouse in order to provide an overview of test results for the Web Products Organization. Menu choice 510 can provide an overview for a specific group of computing resources, such as a workgroup, within the organization. In this case, the various group names for which results are available are provided in drop down box 512. Menu option 514 provides a way to access older results for various groups, using drop down box 516.

FIG. 6 presents a screen, 600, which provides overview statistics for the Web Products Group previously discussed by way of example. Section 602 of screen 600 provides overview information such as the number of servers tested, an overall compliance score (99.80%), and additional information on numbers of issues passed, passed with exception, and failed. This section also lists the number of checks made. Lower portion 604 of screen 600 includes various columns listing essentially the same statistics as above, but broken down by workgroup, as shown in column 606. This particular Web page can be set up so that when the "button" for a group is pressed, detailed statistics for that group are then presented in another page.

As will be appreciated by one of skill in the art, various levels of detail may be obtained in a typically designed Web application for displaying results from an embodiment of the invention. FIG. 7 shows how a relatively low level of detail might be presented, namely, a specific list of tests and results for a particular server. FIG. 7 illustrates screen 700, which provides security scan results for a server designated "cisco-conf." List 702 names the "n" tests performed on this server, and whether each passed, failed, or passed with exception. For clarity, only the first three and last two tests are shown. Many tests can be performed and displayed in such a list, and their variable nature is illustrated by way of the ellipses dots which indicate that a varied amount of information may exist in the table between the beginning and the end.

The first three tests shown in the example of FIG. 7 are: the "SYSTEMFILES" test which is a determination as to whether all system files are secured; the "PASSWD" test, which verifies whether the password for this machine is a secure length and format; and the "SERVICES" test which verifies whether any services which represent a security exposure are enabled. At the end of the table, a "LOGINLOG" test and a "SYSLOG" test verify that logs are being kept so that inappropriate access to the system can be tracked. Section 704 of screen display 700 displays overall statistics for this particular server.

It cannot be overemphasized that there are infinite design choices available when implementing a system like that disclosed herein. Likewise, specific screen layouts and displays can be infinitely varied. As some examples, native OS command line languages, as well as Korn shell (ksh) scripts can be used. In addition, the PERL programming language can be used to develop the various agents that are used in implementing an embodiment of the invention. An SQL database can be used to store required information such as test results and configuration data. The Web site created through which results can be accessed can be enabled by the use of HTML embedded scripting languages such as the well known "PHP," a server side application for dynamic Web content. SSH, FTP, or other file transfer protocols can be used to move files between the various entities being used to implement an embodiment of the invention.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of monitoring security-related settings for each of a plurality of computing systems, the method comprising:

accessing, by a computing device processor, a plurality of security-related settings for a computing system;

accessing, by a computing device processor, an exceptions file including at least one exception associated with at least one of the security-related settings;

testing, by a computing device processor, each security-related setting from among the plurality of security-related settings for the computing system, wherein the security-related settings tested include (a) determining whether system files are set to a read-only state, (b) determining whether access passwords are a predetermined length and a predetermined format, and (c) determining whether appropriate access logging functions are activated;

assigning, by a computing device processor, one of a "pass" status for each tested security-related setting that passes testing, a "fail" status for each tested security-related setting that fails testing and does not have an associated exception in the execution file, or a "pass with exception" status for each tested security-related setting that fails testing and has an associated exception in the exception file;

recording, in computing device memory, based on the testing and at least in part on the at least one exception, the "pass", "fail" or "pass with exception" status for each security-related setting to produce a compliance report for the computing system; and displaying, on a computing device user-interface, at least a portion of the compliance report including (a) the "pass", "fail" or "pass with exception" status for each security-related setting tested, (b) percentages for the security-related settings that passed testing, passed with exception and failed, (c) a total number of security-related settings that passed testing and failed testing and (d) a total number of security-related settings tested.

2. The method of claim 1 further comprising calculating, by a computing device processor, a compliance score for the computing system, wherein the compliance report includes the compliance score.

3. The method of claim 1 wherein the testing is executed by an agent stored in memory at the computing system.

4. The method of claim 1 wherein the testing is executed remotely by an agent stored in memory at a server connected to the computing system by a network.

5. The method of claim 2 wherein the testing is executed by an agent stored in memory at the computing system.

6. The method of claim 2 wherein the testing is executed remotely by an agent stored in memory at a server connected to the computing system by a network.

7. The method of claim 1 wherein the displaying of the at least a portion of the compliance report further comprises sending, via a computing device the portion via Email.

8. The method of claim 1 wherein the displaying of the at least a portion of the compliance report further comprises accessing, by a computing device processor, an Internet-based Web page that includes the portion of the compliance report and displaying, on the computing device user-interface, the at least a portion via the Web page.

9. The method of claim 2 wherein the displaying of the at least a portion of the compliance report further comprises sending, via a computing device the portion via Email.

10. The method of claim 2 wherein the displaying of the at least a portion of the compliance report further comprises accessing, by a computing device processor, an Internet-based Web page that includes the portion of the compliance report and displaying, on the computing device user-interface, the at least a portion via the Web page.

11. A computer program product comprising a non-transitory storage medium including computer program code for monitoring security-related settings for a computer system, the computer program code comprising:

instructions for accessing a plurality of security-related settings associated with the computing system;

instructions for accessing an exceptions file including at least one exception associated with at least one of the security-related settings;

instructions for testing each security-related setting from among the plurality of security-related settings for the computing system, wherein the security-related settings tested include (a) determining whether system files are set to a read-only state, (b) determining whether access passwords are a predetermined length and a predetermined format, and (c) determining whether appropriate access logging functions are activated;

instructions for assigning one of a "pass" status for each tested security-related setting that passes testing, a "fail" status for each tested security-related setting that fails testing and does not have an associated exception in the execution file, or a "pass with exception" status for each tested security-related setting that fails testing and has an associated exception in the exception file;

instructions for recording, based on the testing and at least in part on the at least one exception, the "pass", "fail" or "pass with exception" status for each security-related setting to enable production of a compliance report for the at least one computing system; and instructions for displaying at least a portion of the compliance report including (a) the "pass", "fail" or "pass with exception" status for each security-related setting tested, (b) percentages for the security-related settings that passed testing, passed with exception and failed, (c) a total number of security-related settings that passed testing and failed testing and (d) a total number of security-related settings tested.

12. The computer program product of claim 11 wherein the computer program code further comprises instructions for calculating a compliance score for the at least one computing system.

13. The computer program product of claim 12 wherein the computer program code further comprises instructions for producing the compliance report including the compliance score, wherein at least a portion of the compliance report is disposed to be displayed by at least one of Email and a Web page.

14. A system for monitoring security-related settings for a plurality of client devices, the system comprising:

a plurality of client devices, each client device including a processor and a memory;

a client agent stored in the memory of each client device, executable by the client device processor of the client device and configured to:

access a plurality of security-related settings for the client device, access an exceptions file including at least one exception associated with at least one of the security-related settings, test each security-related setting from among the plurality of security-related settings, wherein the security-related settings tested include (a) determining whether system files are set to a read-only state, (b) determining whether access passwords are a predetermined length and a predetermined format, and (c) determining whether appropriate access logging functions are activated, assign one of a "pass" status for each tested security-related setting that passes testing, a "fail" status for each tested security-related setting that fails testing and does not have an associated exception in the execution file, or a "pass with exception" status for each tested security-related setting that fails testing and has an associated exception in the exception file, and record the "pass", "fail" or "pass with exception" status for each security related setting based on the testing and at least in part on the at least one exception;

a server device including a processor and a memory; and a server agent stored in the memory of the server device, executable by the server device processor and configured to communicate with the client agent and produce a compliance report for the computing system wherein at least a portion of the compliance report can be displayed by at least one of electronic mail (Email) or a Web page and wherein the compliance report includes (a) the "pass", "fail" or "pass with exception" status for each security-related setting tested, (b) percentages for the security-related settings that passed testing, passed with exception and failed, (c) a total number of security-related settings that passed testing and failed testing and (d) a total number of security-related settings tested.

15. The system of claim 14 wherein the client agent is further configured to calculate a compliance score for the at least one computing system.

16. A system for monitoring security-related settings for a plurality of client devices, the system comprising:
  a plurality of client devices, each client device including a processor and a memory;
  a client agent stored in the memory of each client device, executable by the client device processor of the client device and configured to access raw data regarding a plurality of security-related settings for a computing system and forward the raw data; and
  a server device including a processor and a memory; and
  a server agent stored in the memory of the server device, executable by the server device processor and configured to:
    receive the raw data,
    access an exceptions file including at least one exception associated with at least one of the security-related settings for one of the client devices,
    test each security-related setting from among the plurality of security-related settings, wherein the security-related settings tested include (a) determining whether system files are set to a read-only state, (b) determining whether access passwords are a predetermined length and a predetermined format, and (c) determining whether appropriate access logging functions are activated,
    assign one of a "pass" status for each tested security-related setting that passes testing, a "fail" status for each tested security-related setting that fails testing and does not have an associated exception in the execution file, or a "pass with exception" status for each tested security-related setting that fails testing and has an associated exception in the exception file,
    record the "pass", "fail" or "pass with exception" status for each security related setting based on the testing and at least in part on the at least one exception, and
    produce a compliance report for the computing system wherein at least a portion of the compliance report can be displayed by at least one of electronic mail (Email) or a Web page and wherein the compliance report includes (a) the "pass", "fail" or "pass with exception" status for each security-related setting tested, (b) percentages for the security-related settings that passed testing, passed with exception and failed, (c) a total number of security-related settings that passed testing and failed testing and (d) a total number of security-related settings tested.

17. The system of claim 16 wherein the server agent is further configured to calculate a compliance score for the at least one computing system.

* * * * *